United States Patent [19]

Antenucci et al.

[11] Patent Number: 5,397,588
[45] Date of Patent: * Mar. 14, 1995

[54] REDUCED CALORIE FRUIT SPREADS

[75] Inventors: Robert N. Antenucci, Hamilton, N.J.; Thomas R. Davis, Yardley, Pa.; François Y. Mani re, Princeton Junction; Susan E. Sharp, Somerset, both of N.J.

[73] Assignee: McNeil-PPC, Inc., Milltown, N.J.

[*] Notice: The portion of the term of this patent subsequent to Dec. 14, 2010 has been disclaimed.

[21] Appl. No.: 141,166

[22] Filed: Oct. 21, 1993

Related U.S. Application Data

[63] Continuation-in-part of Ser. No. 900,643, Jun. 18, 1992, Pat. No. 5,270,071.

[51] Int. Cl.$^6$ ............... A23L 1/0524; A23L 1/0526
[52] U.S. Cl. .................. 426/573; 426/577; 426/548; 426/804
[58] Field of Search ............... 426/573–577, 426/548, 804

[56] References Cited

U.S. PATENT DOCUMENTS

| | | | |
|---|---|---|---|
| 3,642,491 | 2/1972 | Schlatter | 426/575 |
| 3,692,441 | 9/1972 | Altieri et al. | 426/577 |
| 3,800,046 | 3/1974 | Schlatter | 426/576 |
| 3,947,604 | 3/1976 | McGinley et al. | 426/577 |
| 4,370,350 | 1/1983 | Liepold | 426/577 |
| 4,496,603 | 1/1985 | Manabe et al. | 426/577 |
| 5,093,137 | 3/1992 | Shazer et al. | 426/42 |
| 5,270,071 | 12/1993 | Sharp et al. | 426/577 |

FOREIGN PATENT DOCUMENTS

59-192045 10/1984 Japan.
63-044853 2/1988 Japan.

*Primary Examiner*—Jeanette Hunter
*Attorney, Agent, or Firm*—Charles J. Metz

[57] ABSTRACT

A reduced calorie fruit spread comprising the gelled product of:
 a. water;
 b. fruit or fruit flavoring;
 c. one or more high intensity sweeteners selected from the group consisting of aspartame; saccharin; acesulfame-K; mixtures thereof; and mixtures of aspartame, saccharin, or acesulfame-K with sucralose;
 d. low methoxy pectin or carrageenan;
 e. carboxymethylcellulose;
 f. guar gum; and
 g. locust bean gum.

6 Claims, 8 Drawing Sheets

REDUCED CALORIE FRUIT SPREADS

CROSS-REFERENCE TO RELATED APPLICATION

This application is a continuation-in-part of copending U.S. application Ser. No. 900,643, filed on Jun. 18, 1992, now U.S. Pat. No. 5,270,071.

The invention relates to a reduced calorie fruit spread containing one or more high intensity sweeteners and a multicomponent hydrocolloid mixture.

BACKGROUND OF THE INVENTION

Traditional reduced-calorie, low-solids fruit spread products are inherently low in sweetness intensity, poor in sweetness quality and possess a number of textural defects in comparison to their full-calorie counterparts. These defects are characterized by a grainy, brittle, thin texture which lacks the desired spreadability and mouthfeel associated with full-calorie, high-solids products. Carbohydrate sweeteners such as sucrose provide many of the desired textural and flavor attributes. Likewise, traditional low calorie, artificially sweetened fruit spread products possess many of the same textural and flavor defects as the low-sugar products.

High methoxy pectins are used in conventional full calorie high-solids fruit spread products. These pectins are stable to low pH and high temperature conditions; however, they do not gel in the absence of high solids. Most artificially sweetened and low-sugar fruit spread products (which have lower solids content than full calorie spreads because of the reduced sugar content) utilize low methoxy pectin (set with calcium) or carrageenan as the gelling agent. However, textural defects are apparent in products formulated with these gelling agents.

The use of conventional hydrocolloid systems such as carrageenan and low methoxy pectin in reduced calorie (low solids) fruit spreads only provide a gel structure of poor body and mouthfeel. Conventional low-solids formulations do not match the textural quality of high-solids products.

Over the past few years, several reduced-calorie aspartame sweetened fruit spreads have become commercially available. There is significant room for improvement in the storage stability and organoleptic properties of these products. Traditional full calorie fruit spreads usually have pH values of about 3.0–3.2. The commercially available aspartame fruit spreads have pH values of about 3.6–3.7, because at the traditional pH values aspartame would lack sufficient stability to have a reasonable shelf life. However, at the higher pH of 3.6–3.7, for grape products in particular, the characteristic tartness/flavor profile exhibited by traditional products at a pH of 3.0–3.2 is lacking. Also, at the higher pH values, color stability is decreased for certain fruit spreads such as grape jelly. The presently available aspartame-containing spreads, even at the higher pH, are less than fully acceptable because of poor sweetener stability, poor flavor, and (regardless of the pH) poor textural properties.

In the U.S., saccharin also is available in a number of reduced calorie fruit spreads. Saccharin products have good stability; however, they often have a bitter, lingering aftertaste and poor textural qualities.

It is an objective of the invention to provide reduced-calorie, reduced-solids fruit spread products which approach the overall organoleptic quality to full-calorie, high-solids products. This objective is accomplished by use of a multi-component gum system in combination with one or more high intensity sweeteners selected from the group consisting of aspartame; saccharin; acesulfame-K; mixtures thereof; and mixtures of aspartame, saccharin, or acesulfame-K with sucralose. The multi-component hydrocolloid system provides the desired textural attributes that have been missing from the heretofore available reduced calorie fruit spreads.

BRIEF DESCRIPTION OF THE INVENTION

The invention provides a reduced calorie fruit spread prepared from a composition that comprises:
  a. water;
  b: fruit or fruit flavoring;
  c. a high intensity sweetener selected from the group consisting of aspartame; saccharin; acesulfame-K; mixtures thereof; and mixtures of aspartame, saccharin, or acesulfame-K with sucralose;
  d. low methoxy pectin or gum carrageenan;
  e. carboxymethylcellulose;
  f. guar gum; and
  g. locust bean gum.

In addition, the fruit spread of the invention may contain one or more buffering agents, acids, preservatives, and other similar materials that are normally employed in fruit spreads.

DESCRIPTION OF THE DRAWINGS

FIG. 7 is a graph showing the sweetness, tartness, and flavor of a fruit spread containing sucralose high intensity sweetener, after storage for one year at 5° C., 20° C.

and 30° C., compared with a freshly purchased full calorie commercial product.

DETAILED DESCRIPTION OF THE INVENTION

It is the principal objective of this invention to provide reduced-calorie, low-solids fruit spread products which approach the sensory (sweetness intensity, quality, flavor, etc.), visual (color, clarity, gloss, etc.), and textural (firmness, body, mouthfeel, spreadability, etc.) properties of full-calorie, high-solids fruit spread products. Such fruit spread products include jams, jellies, marmalades, preserves and related products. As a general rule, the fruit spreads of the invention will have not more than about 9 calories per teaspoon (equivalent to about 1.5 calories per gram).

The use of the high intensity sweeteners, as defined herein, and a multi-component gum system in combination provides reduced-calorie, reduced solids fruit spreads that approach the quality of full-calorie, high solids products. The following product characteristics are necessary to achieve the intended product quality: 1) Acceptable sweetness quality and sweetener stability; 2). Acceptable texture quality and stability; 3) Acceptable color and stability (pH dependent); and 4) Significant reduction in caloric contents (consequently, reduction in carbohydrate solids content).

Satisfaction of the four criteria listed above is required to produce a reduced calorie fruit spread of acceptable quality. It is critical that all criteria be met since failure to meet any of the four will significantly alter the product quality in an adverse manner. These characteristics are provided by employing the high intensity sweeteners, as defined herein, and the multi-component gum system described in detail below.

The required ingredients employed in preparing the reduced calorie fruit spreads of the invention are the following:
a. water;
b. fruit or fruit flavoring;
c. one or more high intensity sweeteners selected from the group consisting of aspartame; saccharin; acesulfame-K; mixtures thereof; and mixtures of aspartame, saccharin, or acesulfame-K with sucralose;
d. low methoxy pectin or gum carrageenan;
e. carboxymethylcellulose;
f. guar gum; and
g. locust bean gum.

The several ingredients will be discussed in turn, below:

Water is employed in the fruit spreads of the invention in proportions of from about 30% to about 75%, by weight. (Unless otherwise stated, all percentages are by weight, based on the total weight of the formulation.) The proportion of water in the reduced-calorie fruit spreads of the invention is significantly higher than in full-calorie jams and jellies. Water provides bulk and the medium from which the gel is made.

The spreads of the invention contain fruit or fruit flavoring or both, depending on the type of spread being produced. The principles here are well understood in the art. For instance, in the preparation of grape jelly, grape juice or grape juice concentrate and grape flavor essence can be used; in preparing strawberry jam, whole strawberries may be used, perhaps in combination with strawberry flavoring; in preparing orange marmalade, shredded orange skin, orange juice, and pieces of orange may be used. The principles employed in the selection of the type and proportion of fruit and fruit flavoring are analogous to those that are employed in preparing full calorie fruit spreads, and are known in the art. As a general rule, the fruit or fruit juice will be employed in an amount within the range of from about 15 to 30%, by weight, and fruit flavor concentrate will usually be employed in an amount within the range of from about 0.5 to 3%, by weight.

The nonnutritive high intensity sweeteners that are used in the invention are aspartame; saccharin; acesulfame-K; mixtures thereof; and mixtures of aspartame, saccharin, or acesulfame-K with sucralose. These high intensity sweeteners are known in the art. Their official chemical names are the following:

Aspartame is N-L-α-aspartyl-L-phenylalanine 1-methyl ester;

Saccharin is 1,2-benzisothiazol-3(2H)-one 1,1-dioxide;

Acesulfame-K is 6-methyl-1,2,3-oxathiazin-4(3H)-one 2,2-dioxide, potassium salt; and Sucralose is 4-chloro-4-deoxy-α-D-galactopyranosyl-1,6-dichloro-1,6-dideoxy-β-D-fructofuranoside.

The nature and preparation of these high intensity sweeteners is known in the art.

The high intensity sweetener is used in the fruit spread of the invention in an amount sufficient to impart the desired degree of sweetness, which amount will usually be within the range of from about 0.05% to about 0.4%, and preferably, from about 0.06% to about 0.35%. When sugar or other carbohydrate sweeteners (in a reduced amount, compared to full calorie spreads) are included in the formulation, less high intensity sweetener will be employed.

The fruit spreads of the invention contain low methoxy pectin or carrageenan. Pectins are articles of commerce whose use in the food industry is well known. Pectins are carbohydrate materials that are derived from fruits, and are considered to be long-chain, partially methylated, polygalacturonic acid chains having a large molecular weight. Low methoxy "LM" pectins are pectins that have a degree of methylation below 50%. The gelling mechanism of LM pectins differs substantially from that of high methoxy "HM" pectins. To obtain gel formation in a system with LM pectin, the presence of a small amount (e.g., from about 0.005% to about 0.1% of the weight of LM pectin in the fruit spread recipe) of calcium ion in the system is normally required. (High methoxy pectin requires significant proportions of sugar, as well as a pH of from about 3.0 to 3.2, for gel formation.) LM pectin is desirable for use in this invention, especially in the preparation of grape spreads, because LM pectins are stable at lower pH's (3.0), especially when exposed to elevated temperature processing conditions. (Fruit spread products having lower pH's can be prepared in accordance with the invention when aspartame is not one of the high intensity sweeteners employed.) It is desired to reduce the pH of the product to about 3.0 to prevent degradation of the natural anthocyanin pigments (purple/red) contained in grapes; such degradation results in the formation of an undesirable brown color. Therefore, formulating at pH 3.0 and using LM pectin in the grape spreads of the invention produces a product that is stable under typical processing and storage conditions throughout the expected shelf-life. The LM pectin is used in a proportion of from about 0.85 to 1.25%, by weight, in the grape spreads of the invention.

In formulating fruit spreads other than grape, such as strawberry, raspberry, orange, etc., jams and jellies, which may be formulated at higher pH values (e.g., pH's of 3.6-3.7), carrageenan (as well as LM pectin) may be used as the gelling agent. Carrageenan is also an article of commerce whose use in the food industry is well known. It is a polysaccharide derived from a seaweed known as Irish moss. Carrageenan is ordinarily used in proportions of from about 0.45 to 0.50%, by weight.

The major novelty of the invention resides in the use of a mixture of carboxymethylcellulose, guar gum, and locust bean gum. The combination of these three materials imparts desirable textural properties to a LM pectin or to a carrageenan gel. These three materials are articles of commerce and their use in the food industries is well known. Carboxymethylcellulose (often referred to as "CMC") is prepared by treating cellulose with sodium hydroxide and then reacting it with sodium monochloroacetate. Food grade CMC is used in the fruit spreads of the invention in proportions of from about 0.15% to about 0.6%, by weight. Guar gum is a galactomannan polysaccharide derived from the guar plant. It is used in the fruit spreads of the invention in proportions of from about 0.05% to about 0.60%, by weight. Locust bean gum is another galactomannan that is derived from the seed of the carob tree. It is used in the fruit spreads of the invention in proportions of from about 0.005% to about 0.10%, by weight.

The fruit spreads can be produced by procedures that are analogous to those that are known in the art. The examples, below, contain illustrative methods of preparation. One point needs to be emphasized. As is illustrated below in the Examples, it is important that the several gums that are used in the invention be dispersed using high shear agitation. (Traditional processing of full-calorie fruit products does not require high shear mixing.) All other processing steps are similar to those that are known in the art.

The examples below illustrate the invention:

Example 1

GRAPE JELLY REDUCED CALORIE—2 CALORIE SWEETENED WITH SUCRALOSE AND ACESULFAME-K

An 85–90% calorie-reduced sucralose/acesulfame-K sweetened grape spread was prepared in accordance with the principles of the invention. This fruit spread contained 2-Cal./tsp., whereas a full-calorie grape jelly typically contains 17–18 Cal./tsp. The reduced calorie grape spread was formulated to contain 14–18% soluble solids, to have a pH of 3.0–3.2, and to be iso-sweet with a commercial full-calorie grape jelly. Ingredient and processing information are shown below.

| PRODUCT FORMULA | |
|---|---|
| INGREDIENTS | AMOUNT (GRAMS) |
| Water | 5932.8 |
| Grape Juice Concentrate | 1520 |
| Grape Essence | 100 |
| Natural Grape Flavor | 160 |
| LM Pectin | 100 |

| -continued | |
|---|---|
| Phosophoric Acid | 64 |
| Potassium Sorbate | 28 |
| Sodium Hexametaphosphate | 20 |
| Citric Acid | 16 |
| Sucralose | 11.2 |
| Acesulfame-K | 4 |
| Carboxymethylcellulose | 24 |
| Guar Gum | 12 |
| Locust Bean Gum | 4 |
| Calcium Chloride | 4 |
| TOTAL | 8000.0 |

| INGREDIENT SOURCES | | |
|---|---|---|
| Grape Juice Concentrate | 68° Brix | Welch's |
| Water | Distilled, Deionized | |
| Grape Essence | 150 Fold | Great Lakes |
| Natural Grape Flavor | #5-8798 | Bush Boake Allen |
| Phosphoric Acid | 25% Solution | Rhone Poulenc |
| Potassium Sorbate | 20% Solution | Pfizer |
| Sodium Hexametaphosphate | | Rhone Poulenc |
| Citric Acid | 50% Solution | Pfizer |
| Sucralose | 25% Liquid Concentrate | McNeil Specialty Products Co. |
| Acesulfame-K | Powder | Hoechst-Celanese |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |

PREPARATION PROCEDURE

Equipment: High Shear Mixer
Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add grape juice concentrate (68° Brix).
4. Add sucralose and acesulfame-K and sorbate solutions.
5. Add grape essence, calcium chloride and grape flavor.
6. Add phosphoric and citric acid solutions.
7. Standardize batch to 100% yield with water.
8. Heat to 165° F.
9. Hot fill into jars (165° F. minimum). Maintain constant agitation and minimum temperature of 165° F. throughout the process.
10. Cap the jars and flip over for at least 1 minute before cooling with ice bath.

| APPROXIMATE SPECIFICATIONS | |
|---|---|
| pH: | 3.16 |
| Bx-Tc: | 16.4 @ 25.3° C. |
| A$_w$: | 0.973 @ 24.4° C. |

Example 2

GRAPE JELLY REDUCED CALORIE—2 CALORIE SWEETENED WITH ASPARTAME AND ACESULFAME-K

An 85–90% calorie-reduced aspartame/acesulfame-K sweetened grape spread was prepared in accordance with the principles of the invention. This fruit spread contained 2-Cal./tsp., whereas a full-calorie grape jelly typically contains 17–18 Cal./tsp. The reduced calorie grape spread was formulated to contain 14–18% soluble solids, to have a pH of 3.4–3.5, and to be iso-sweet with a commercial full-calorie grape jelly. Ingredient and processing information are shown below.

| PRODUCT FORMULA | | |
|---|---|---|
| INGREDIENTS | AMOUNT (GRAMS) | |
| Water | 5940 | |
| Grape Juice Concentrate | 1520 | |
| Grape Essence | 100 | |
| Natural Grape Flavor | 160 | |
| LM Pectin | 100 | |
| Potassium Sorbate | 28 | |
| Sodium Hexametaphosphate | 20 | |
| Aspartame | 4 | |
| Acesulfame-K | 4 | |
| Carboxymethylcellulose | 24 | |
| Guar Gum | 12 | |
| Locust Bean Gum | 4 | |
| Calcium Chloride | 4 | |
| TOTAL | 8000.0 | |
| INGREDIENT SOURCES | | |
| Grape Juice Concentrate | 68° Brix | Welch's |
| Water | Distilled, Deionized | |
| Grape Essence | 150 Fold | Great Lakes |
| Natural Grape Flavor | #5-8798 | Bush Boake Allen |
| Potassium Sorbate | 20% Solution | Pfizer |
| Sodium Hexametaphosphate | | Rhone Poulenc |
| Aspartame | Powder | Nutrasweet |
| Acesulfame-K | Powder | Hoechst-Celanese |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |

PREPARATION PROCEDURE

Equipment: High Shear Mixer
Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add grape juice concentrate (68° Brix).
4. Add aspartame and acesulfame-K and sorbate solutions.
5. Add grape essence, calcium chloride and grape flavor.
6. Standardize batch to 100% yield with water.
7. Heat to 165° F.
8. Hot fill into jars (165° F. minimum). Maintain constant agitation and minimum temperature of 165° F. throughout the process.
9. Cap the jars and flip over for at least 1 minute before cooling with ice bath.

| APPROXIMATE SPECIFICATIONS | |
|---|---|
| pH: | 3.47–3.5 |
| Bx-Tc: | 16.8 @ 24.5° C. |
| $A_w$: | 0.968 @ 23.9° C. |

Example 3

GRAPE JELLY REDUCED CALORIE—2 CALORIE SWEETENED WITH ASPARTAME AND SACCHARIN

An 85–90% calorie-reduced aspartame/saccharin sweetened grape spread was prepared in accordance with the principles of the invention. This fruit spread contained 2-Cal./tsp., whereas a full-calorie grape jelly typically contains 17–18 Cal./tsp. The reduced calorie grape spread was formulated to contain 14–18% soluble solids, to have a pH of 3.4–3.5, and to be iso-sweet with a commercial full-calorie grape jelly. Ingredient and processing information are shown below.

| PRODUCT FORMULA | | |
|---|---|---|
| INGREDIENTS | AMOUNT (GRAMS) | |
| Water | 5942.56 | |
| Grape Juice Concentrate | 1520 | |
| Grape Essence | 100 | |
| Natural Grape Flavor | 160 | |
| LM Pectin | 100 | |
| Potassium Sorbate | 28 | |
| Sodium Hexametaphosphate | 20 | |
| Aspartame | 1.6 | |
| Sodium Saccharin | 3.84 | |
| Carboxymethylcellulose | 24 | |
| Guar Gum | 12 | |
| Locust Bean Gum | 4 | |
| Calcium Chloride | 4 | |
| TOTAL | 8000.0 | |
| INGREDIENT SOURCES | | |
| Grape Juice Concentrate | 68° Brix | Welch's |
| Water | Distilled, Deionized | |
| Grape Essence | 150 Fold | Great Lakes |
| Natural Grape Flavor | #5-8798 | Bush Boake Allen |
| Potassium Sorbate | 20% Solution | Pfizer |
| Sodium Hexametaphosphate | | Rhone Poulenc |
| Aspartame | Powder | Nutrasweet |
| Sodium Saccharin | Powder | PMC Specialties Group |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |

PREPARATION PROCEDURE

Equipment: High Shear Mixer
Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add grape juice concentrate (68° Brix).
4. Add aspartame and saccharin and sorbate solutions.
5. Add grape essence, calcium chloride and grape flavor.
6. Standardize batch to 100% yield with water.
7. Heat to 165° F.
8. Hot fill into jars (165° F. minimum). Maintain constant agitation and minimum temperature of 165° F. throughout the process.

9. Cap the jars and flip over for at least 1 minute before cooling with ice bath.

| APPROXIMATE SPECIFICATIONS | |
|---|---|
| pH: | 3.34 |
| Bx-Tc: | 15.8 @ 24.5° C. |
| $A_w$: | 0.976 @ 23.0° C. |

Control Example 1

GRAPE JELLY REDUCED CALORIE—2 CALORIE SWEETENED WITH SUCRALOSE

An 85–90% calorie-reduced sucralose sweetened grape spread was prepared in accordance with the principles of the invention disclosed and claimed in Applicants' parent U.S. Pat. application Serial No. 900,643, filed Jun. 18, 1992. This fruit spread contained 2-Cal./tsp., whereas a full-calorie grape jelly typically contains 17–18 Cal./tsp. The reduced calorie grape spread was formulated to contain 14–18% soluble solids, to have a pH of 3.0–3.2, and to be iso-sweet with a commercial full-calorie grape jelly. Ingredient and processing information are shown below.

| PRODUCT FORMULA | |
|---|---|
| INGREDIENTS | PERCENTAGE (WET WT.) |
| Water | 74.01 |
| Grape Juice Concentrate | 19.00 |
| Natural Grape Flavor | 2.00 |
| Grape Essence | 1.25 |
| LM Pectin | 1.25 |
| Phosphoric Acid | 0.80 |
| Potassium Sorbate | 0.35 |
| Sucralose | 0.34 |
| Carboxymethylcellulose | 0.30 |
| Sodium Hexametaphosphate | 0.25 |
| Citric Acid | 0.20 |
| Guar Gum | 0.15 |
| Locust Bean Gum | 0.05 |
| Calcium Chloride | 0.05 |
| TOTAL | 100.00 |

| INGREDIENT SOURCES | | |
|---|---|---|
| Grape Juice Concentrate | 68° Brix | Welch's |
| Sucrose | Fine Granular | Amstar |
| Water | Distilled, Deionized | |
| Grape Essence | 150 Fold | Great Lakes |
| Natural Grape Flavor | #5-8798 | Bush Boake Allen |
| Phosphoric Acid | 25% Solution | Rhone Poulenc |
| Potassium Sorbate | 20% Solution | Pfizer |
| Sodium Hexametaphosphate | | Rhone Poulenc |
| Citric Acid | 50% Solution | Pfizer |
| Sucralose | 25% Liquid Concentrate | McNeil Specialty Products Co. |
| Carboxymethylcellulose | #7H3SF | Aqualon |
| Guar Gum | FG.1.HV | Colony Import & Export |
| LM Pectin | LM 104-AS | Hercules |
| Calcium Chloride | Dihydrate | Mallinckrodt |
| Locust Bean Gum | FL 50-50 | Hercules |

PREPARATION PROCEDURE

Equipment: High Shear Mixer
Hot Plate Heating Apparatus

1. Dry blend LM pectin, carboxymethylcellulose, guar gum, locust bean gum and sodium hexametaphosphate.
2. Dissolve gum blend mixture in boiling water using high shear mixer.
3. Slowly add grape juice concentrate (68° Brix).
4. Add sucralose and sorbate solutions.
5. Add grape essence, calcium chloride and grape flavor.
6. Add phosphoric and citric acid solutions.
7. Standardize batch to 100% yield with water.
8. Hot fill into jars (165° F. minimum). Maintain constant agitation and minimum temperature, 165° F., throughout process.

| APPROXIMATE SPECIFICATIONS | |
|---|---|
| pH: | 3.0–3.2 |
| Brix: | 16.0 |
| $A_w$: | 0.95 |

Samples of the grape jellies made in accordance with Examples 1–3 and Control Example 1 were stored (a) at 5° C. for one year and (b) 35° C. for seven months, followed by five months at 5° C. The samples were then analyzed for content of the high intensity sweetener(s) contained therein. TABLE 1 displays initial concentrations and the concentrations after storage for 1 year at 5° C. and 35° C.:

TABLE 1

| | | Analytical Results (ppm) | | | |
|---|---|---|---|---|---|
| Example | Storage | Sucralose | Acesulfame-K | Aspartame | Saccharin |
| Control | Initial | 850 | | | |
| | 5° C. | 847 | | | |
| | 35,5° C. | 869 | | | |
| 1 | Initial | 350 | 500 | | |
| | 5° C. | 359 | 485 | | |
| | 35,5° C. | 334 | 370 | | |
| 2 | Initial | | 500 | 500 | |
| | 5° C. | | 509 | 480 | |
| | 35,5° C. | | 412 | 42 | |
| 3 | Initial | | | 200 | 480 |
| | 5° C. | | | 209 | 470 |
| | 35,5° C. | | | 21 | 240 |

The grape jelly products of Examples 1–3 were evaluated and compared to a freshly purchased full calorie grape jelly (Welch's), in accordance with the following procedures:

Storage Stability Studies And Sensory Evaluation

The 2-calorie spreads of Example 1, 2 and 3 and Control Example 1 were stored at 5° C. and 20° C. (the grape jelly of Control Example 1 was also stored at 30° C.) for one year. The grape spreads were examined at 12 months for organoleptic acceptability, and were compared with a freshly purchased commercial full calorie grape jelly (Welch's).

Descriptive sensory analysis and acceptance testing were used to evaluate the sensory attributes of the stored reduced-calorie, high intensity sweetener containing, grape jellies compared with a freshly purchased, commercially available full-calorie grape spread (Welch's grape jelly). Twenty to thirty adult panelists participated in the evaluations. Panelists were asked to rate the spreads for sweetness intensity, tartness intensity, off-flavor intensity, and sweet aftertaste intensity, using a 100 point unstructured line scale. Panelists also were asked to rate the acceptability of the product using a nine-point hedonic scale (1=dislike extremely, 5=neither like nor dislike, 9=like extremely). These evaluations included ratings for sweetness acceptability, tartness acceptability, liking for overall flavor, liking for overall texture, liking for overall product, and liking for spreadability. Data were analyzed using analysis of variance and Tukey's HSD test.

Figure 1:
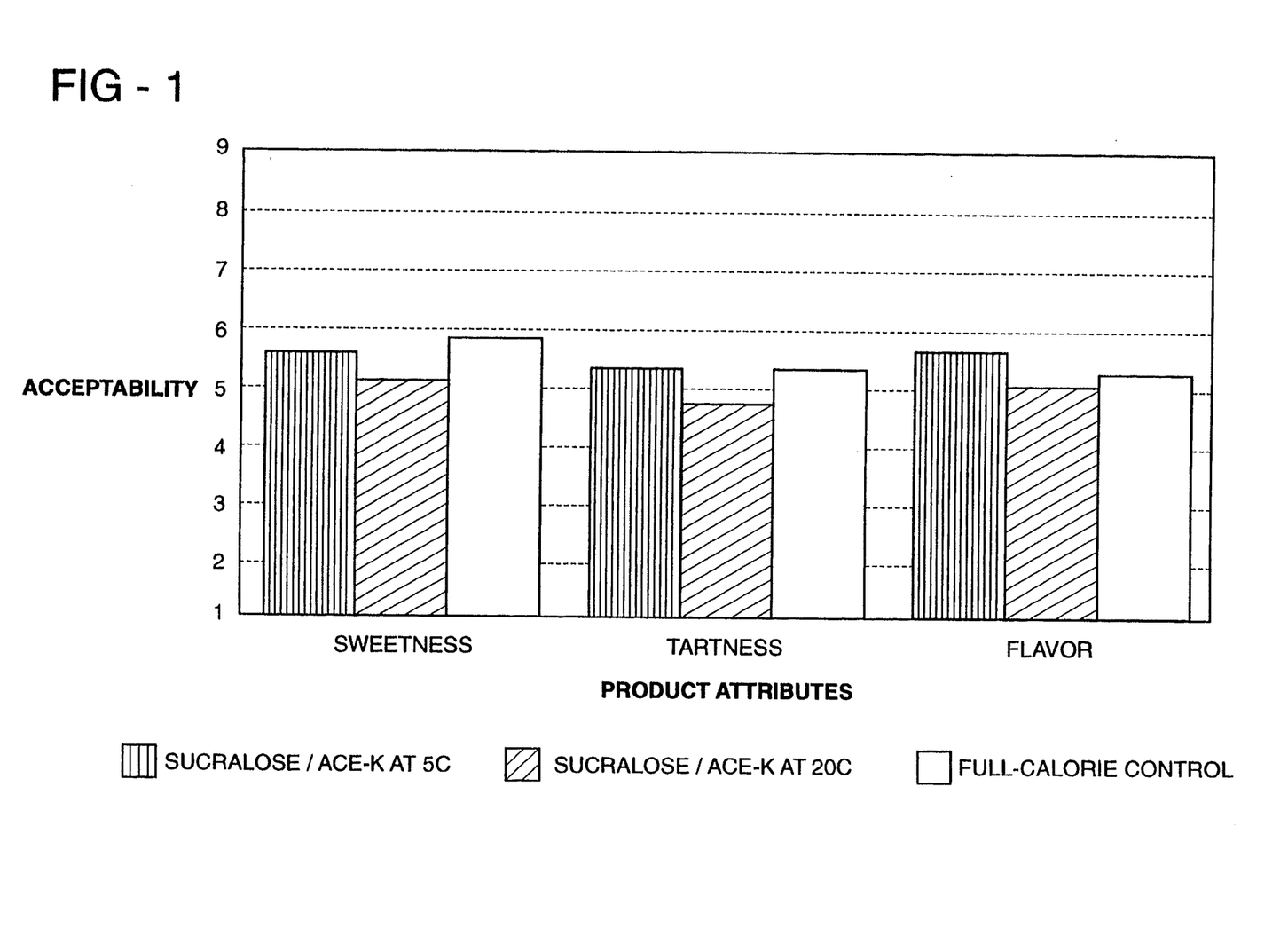
FIG. 1 is a graph showing the sweetness, tartness, and flavor of a fruit spread of the invention containing sucralose and acesulfame-K high intensity sweeteners, after storage for one year at 5° C. and 20° C., compared with a freshly purchased full calorie commercial product.
Figure 2:
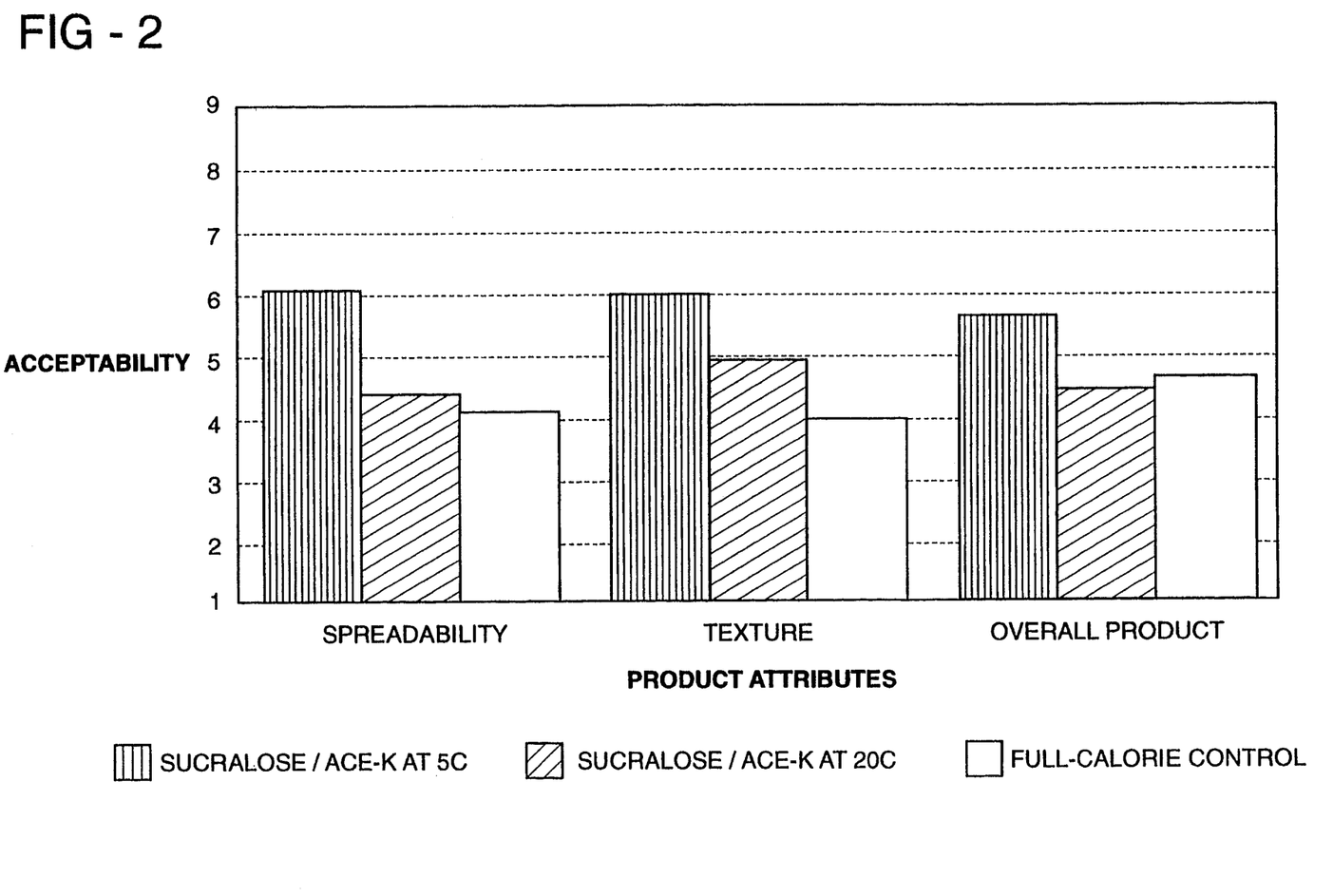
FIG. 2 is a graph showing the spreadability, texture, and overall product quality of a fruit spread of the invention containing sucralose and acesulfame-K high intensity sweeteners, after storage for one year at 5° C. and 20° C. compared with a freshly purchased full calorie commercial product.
Figure 3:
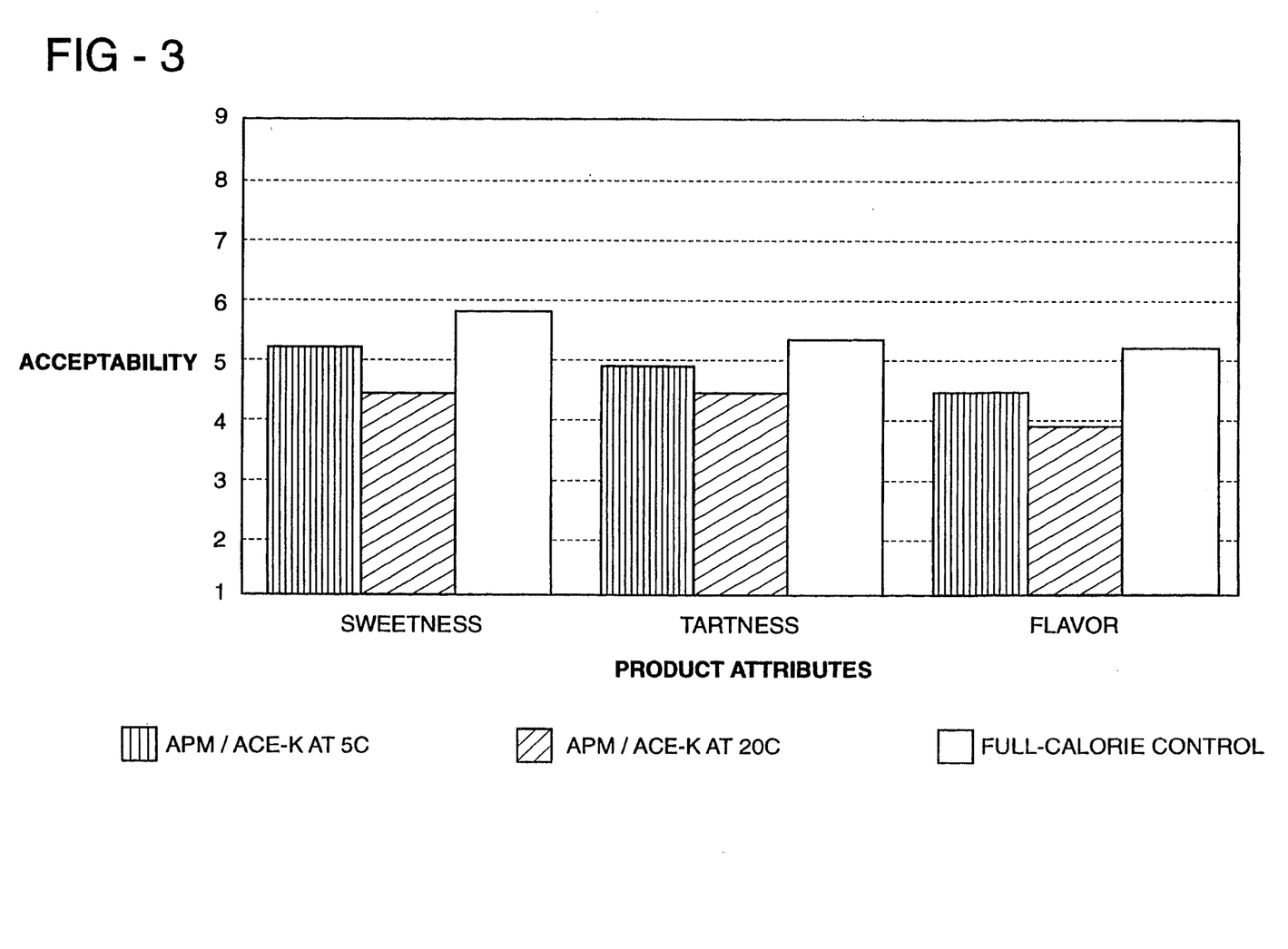
FIG. 3 is a graph showing the sweetness, tartness, and flavor of a fruit spread of the invention containing aspartame and acesulfame-K high intensity sweeteners, after storage for one year at 5° C. and 20° C., compared with a freshly purchased full calorie commercial product.
Figure 4:
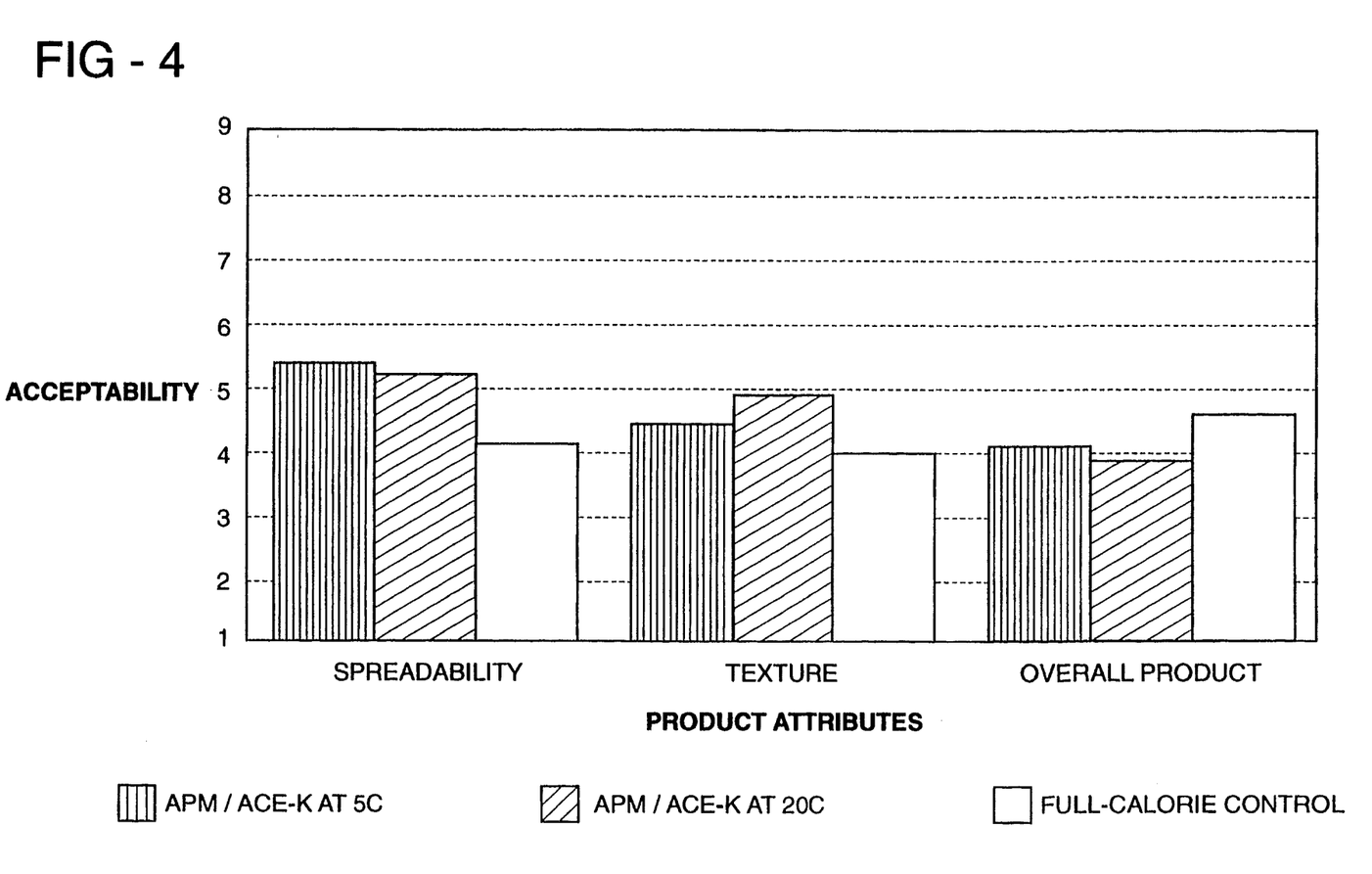
FIG. 4 is a graph showing the spreadability, texture, and overall product quality of a fruit spread of the invention containing aspartame and acesulfame-K high intensity sweeteners, after storage for one year at 5° C. and 20° C. compared with a freshly purchased full calorie commercial product.
Figure 5:
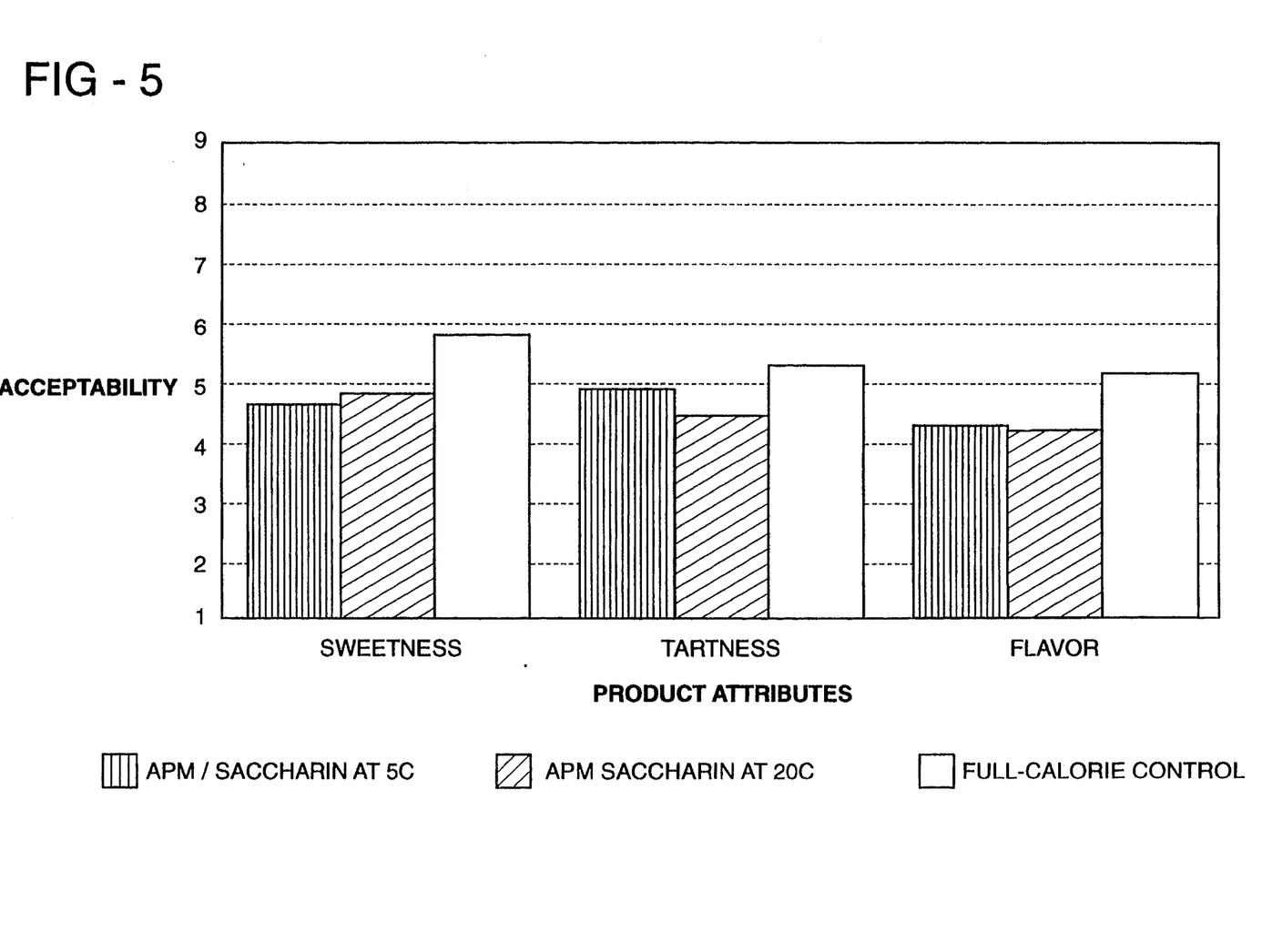
FIG. 5 is a graph showing the sweetness, tartness, and flavor of a fruit spread of the invention containing aspartame and saccharin high intensity sweeteners, after storage for one year at 5° C. and 20° C., compared with a freshly purchased full calorie commercial product.
Figure 6:
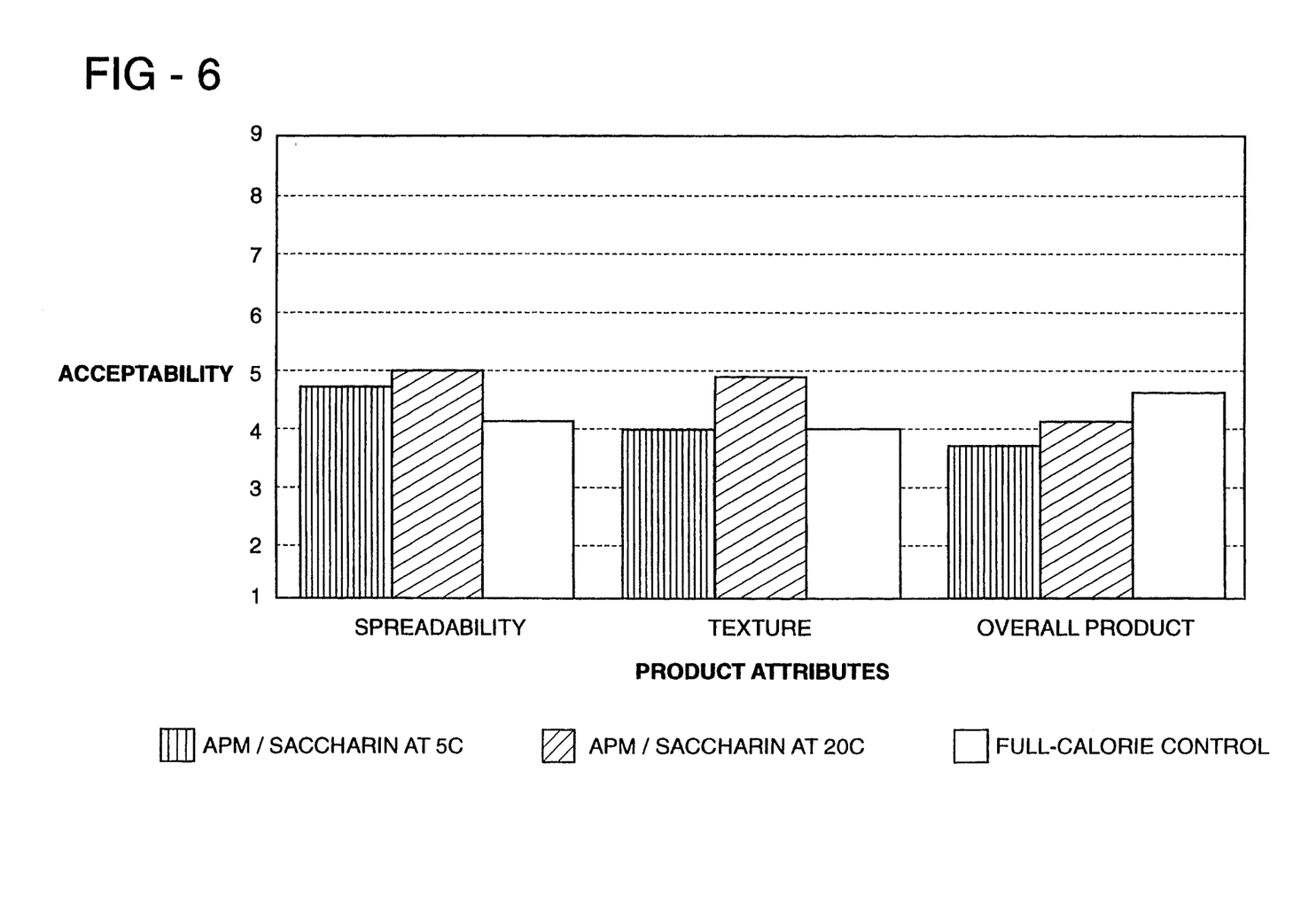
FIG. 6 is a graph showing the spreadability, texture, and overall product quality of a fruit spread of the invention containing aspartame and saccharin high intensity sweeteners, after storage for one year at 5° C. and 20° C., compared with a freshly purchased full calorie commercial product.
Figure 7:
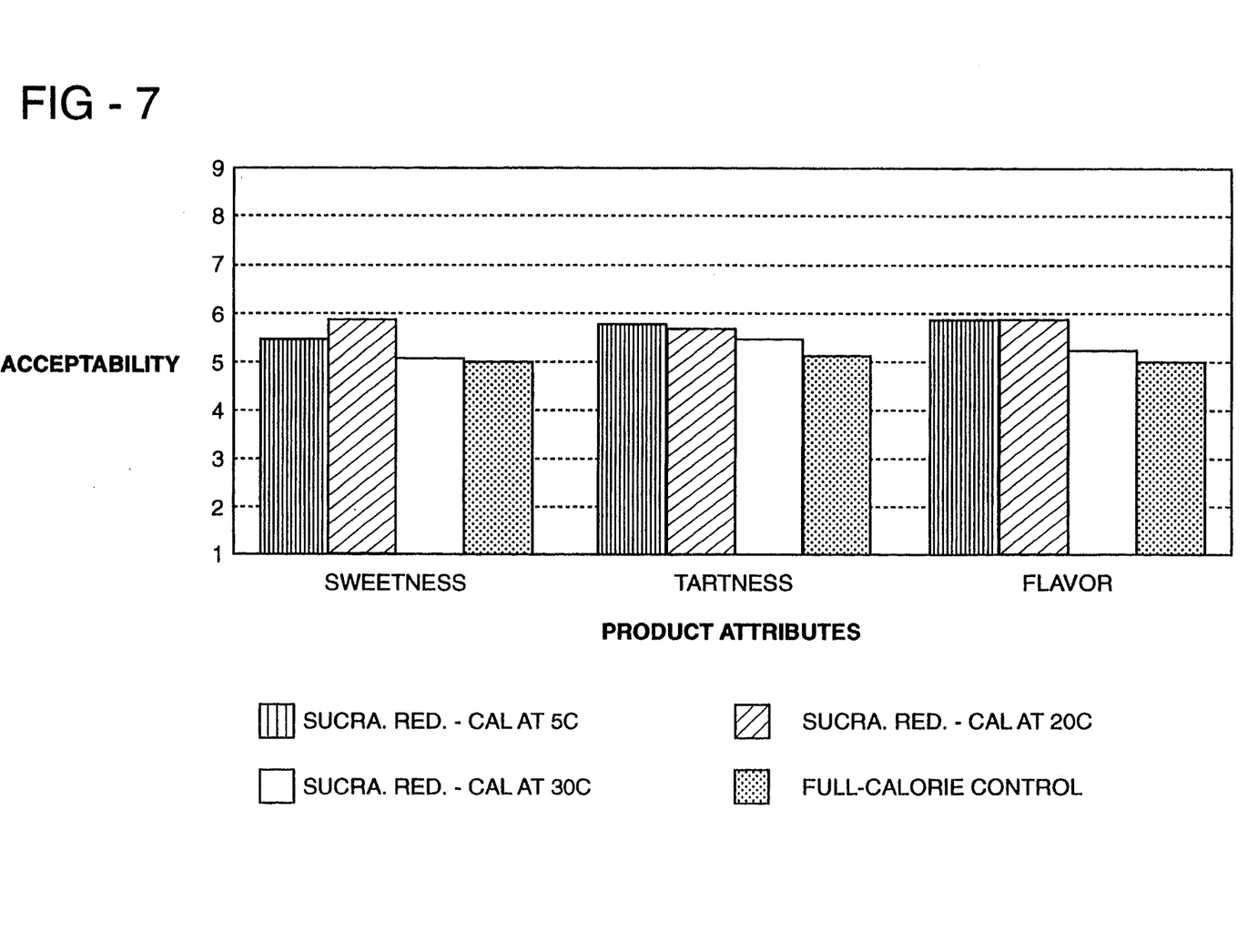
Figure 8:
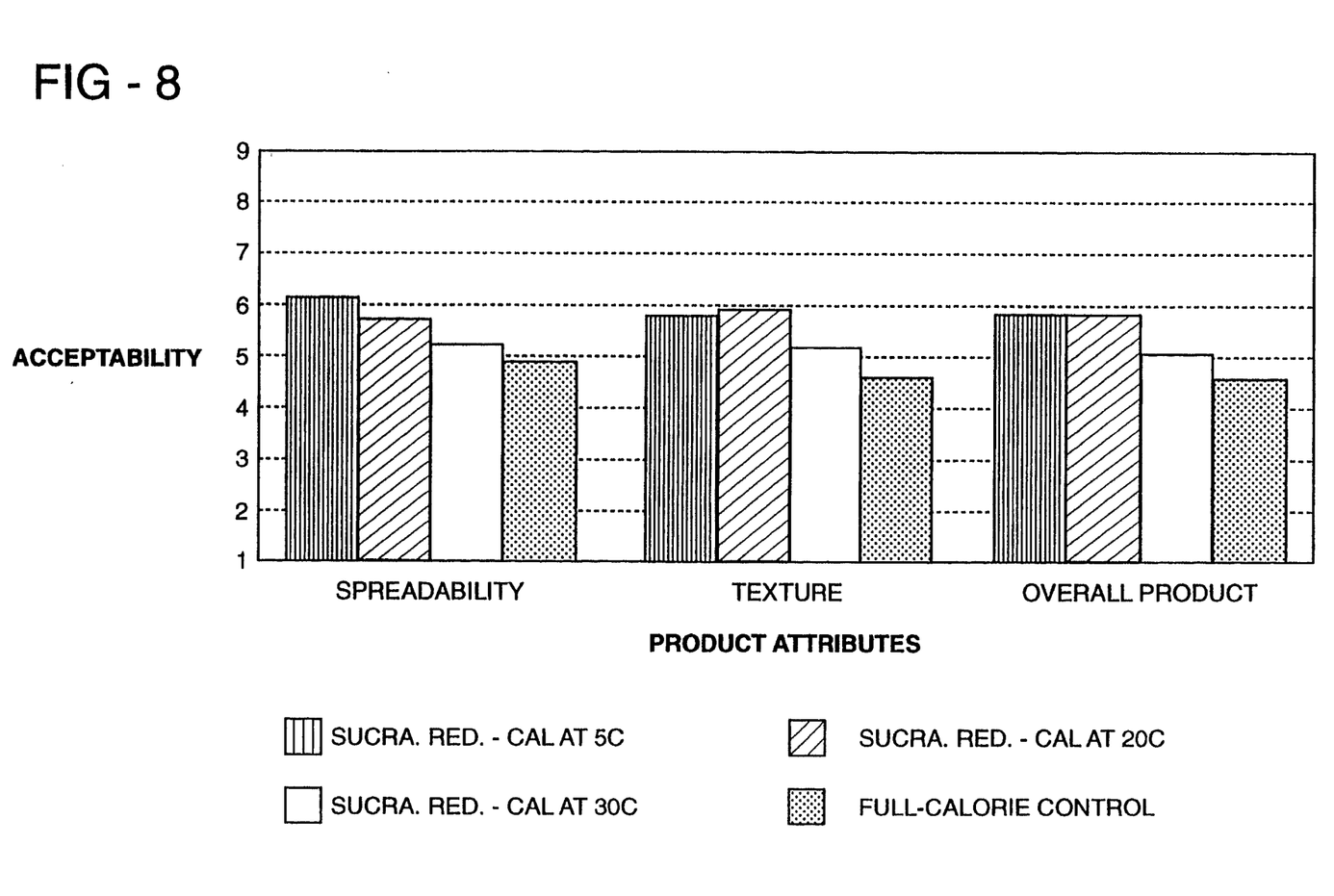
FIG. 8 is a graph showing the spreadability, texture, and overall product quality of a fruit spread containing sucralose high intensity sweetener, after storage for one year at 5° C., 20° C. and 30° C., compared with a freshly purchased full calorie commercial product.

The results of these evaluations, including mean scores and significant differences, are displayed in Table 2, below. Also, the results of the evaluations for sweetness, tartness, flavor, spreadability, texture, and overall product quality, including mean scores and significant differences, are displayed in graphs shown as FIGS. 1-8.

What is claimed is:

1. A fruit spread having not more than 9 calories per teaspoon, said fruit spread comprising the gelled product of:
   a. water;
   b. fruit or fruit flavoring;
   c. one or more high intensity sweeteners selected from the group consisting of aspartame; saccharin; acesulfame-K; mixtures thereof; and mixtures of aspartame, saccharin, or acesulfame-K with sucralose;
   d. low methoxy pectin or carrageenan gelling agent;
   e. carboxymethylcellulose;
   f. guar gum; and
   g. locust bean gum.

2. The fruit spread of claim 1 wherein the fruit is

TABLE 2

| Attribute | Rating Scale | Mean Sensory Ratings for Grape Jelly Sensory Sample Number | | | | | | | | | Significant Difference |
|---|---|---|---|---|---|---|---|---|---|---|---|
| | | 1 | 2 | 3 | 4 | 5 | 6 | 7 | 8 | 9 | |
| | | sucralose 5° C. | sucralose 20° C. | sucra- 350 acek 500 5° C. | sucra- 350 acek 500 20° C. | apm 500 acek 500 5° C. | apm 500 acek 500 20° C. | apm 200 sacch 480 5° C. | apm 200 sacch 480 20° C. | Welch's control | |
| Sweetness Intensity | U | $61.3^{4,6,8}$ | 55.3 | $51.9^6$ | 46.2 | 54.8 | $40.3^6$ | 52.8 | 43.4 | $60.49^{4,6,8}$ | 95% |
| Sweetness Acceptability | 9H | 5.3 | 5.3 | 5.6 | 5.1 | 5.2 | 4.4 | 4.6 | 4.8 | 5.8 | NSD |
| Tartness Intensity | U | 36.5 | 36.8 | 50.5 | 52.4 | 38.4 | 48.1 | 40.1 | 43.7 | $34.0^{3,4}$ | 95% |
| Tartness Acceptability | 9H | 5.5 | 5.5 | 5.3 | 4.7 | 4.9 | 4.4 | 4.9 | 4.4 | 5.3 | NSD |
| Liking for Overall Flavor | 9H | 5.3 | 5.2 | $5.6^6$ | 5.0 | 4.4 | 3.9 | 4.3 | 4.2 | 5.2 | 95% |
| Off-Flavor Intensity | U | 24.7 | 25.1 | $13.2^5$ | 20.7 | 31.6 | 29.3 | 27.0 | 29.5 | 22.4 | 95% |
| Sweet Aftertaste Intensity | U | 31.9 | 31.7 | 22.4 | 25.4 | 29.9 | 21.2 | 29.1 | 26.2 | 27.4 | NSD |
| Liking for overall Texture | 9H | $5.9^{5,7,9}$ | $5.2^{5,7,9}$ | $6.0^{5,7,9}$ | 4.9 | 4.4 | 4.9 | 4.0 | 4.9 | 4.0 | 95% |
| Liking for Spreadability | 9H | $6.5^{2,4,7,8,9}$ | 5.1 | $6.1^{4,9}$ | 4.4 | 5.4 | 5.2 | 4.7 | 5.0 | 4.1 | 95% |
| Liking for overall Product | 9H | $5.4^{6,7}$ | 4.9 | $5.6^{6,7}$ | 4.4 | 4.1 | 3.9 | 3.7 | 4.1 | 4.6 | |

Codes for Scales:
Means followed by superscript number(s) are significantly different (p < 0.05 or 0.10) from samples bearing those sensory sample code numbers.
NSD = No significant differences among samples at the 95% level of significance
U = Unstructured Line Scale anchored from 0 = None to 100 = Extreme
9H = A Nine Point Hedonic Scale anchored from 1 = Dislike Extremely, 5 = Neither Like Nor Dislike, to 9 = Like Extremely.

Sample Identification
1. sucralose 850 ppm, 5°
2. sucralose 850 ppm, 20° C.
3. sucralose 350 ppm/acesulfame-K 500 ppm, 5° C.
4. sucralose 350 ppm/acesulfame-K 500 ppm, 20° C.
5. aspartame 500 ppm/acesulfame-K 500 ppm, 5° C.
6. aspartame 500 ppm/acesulfame-K 500 ppm, 20° C.
7. aspartame 200 ppm/saccharin 480 ppm, 5° C.
8. aspartame 200 ppm/saccharin 480 ppm, 20° C.
9. Welch's full-calorie control, purchased locally at convenience store—(Batch No. 3N17H10J)

grape and wherein the gelling agent is low methoxy pectin.

3. The fruit spread of claim 1 wherein the gelling agent is carrageenan.

4. The fruit spread of claim 1 wherein the high intensity sweetener is a mixture of sucralose and acesulfame-K.

5. The fruit spread of claim 1 wherein the high intensity sweetener is a mixture of aspartame and acesulfame-K.

6. The fruit spread of claim 1 wherein the high intensity sweetener is a mixture of aspartame and saccharin.

* * * * *